(12) United States Patent
Sellen et al.

(10) Patent No.: US 6,718,351 B2
(45) Date of Patent: Apr. 6, 2004

(54) ELECTRONIC RECORD STORAGE

(75) Inventors: Abigail Jane Sellen, Newbury (GB); Kenton Paul Anthony O'Hara, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 09/982,974

(22) Filed: Oct. 22, 2001

(65) Prior Publication Data

US 2002/0052888 A1 May 2, 2002

(30) Foreign Application Priority Data

Oct. 31, 2000 (EP) .............................................. 00309623

(51) Int. Cl.⁷ .............................................. G06F 17/00
(52) U.S. Cl. ....................... 707/203; 707/200; 707/102; 707/10; 707/204
(58) Field of Search .............................. 707/1–10, 100, 707/104.1, 200, 206; 358/434, 466; 382/276, 308

(56) References Cited

U.S. PATENT DOCUMENTS

| | | | |
|---|---|---|---|
| 4,661,988 A | | 4/1987 | Shimizu ...................... 382/306 |
| 5,822,083 A | | 10/1998 | Ito et al. ...................... 358/434 |
| 6,574,729 B1 | * | 6/2003 | Fink et al. ..................... 707/10 |
| 6,577,746 B1 | * | 6/2003 | Evans et al. ................. 707/101 |
| 6,578,056 B1 | * | 6/2003 | Lamburt ......................... 707/7 |

FOREIGN PATENT DOCUMENTS

WO  WO 98/31138  7/1998

OTHER PUBLICATIONS

Amano et al., A feature calibration method for watermarking of document images, 1999, ICDAR '99, Proceedings of the Fifth International Conference on, Sep. 20–22, 1999, pp. 91–94.*

Shima et al, A high–speed algorithm for propagation–type labeling based on block sorting of runs in binary images, Patern Recognition, 1990, Proceedings, 10th International Conference on, vol. i, Jun. 16–21, 1990, pp. 655–658, vol. 1.*

Sharma, Show–through cancellation in scans of duplex printed documents, Image Processing, IEEE Transactions on, vol. 10, Issue 5, May 2001, pp. 736–754.*

Patent Abstracts of Japan, vol. 1998, No. 05, Apr. 30, 1998 & JP 10 021416 (Toshiba Corp), (Jan. 23, 1998) *Abstract*.

* cited by examiner

Primary Examiner—David Jung

(57) ABSTRACT

An electronic record storage system has plural stored changeable records including its content (e.g., a spreadsheet). Each record has a record identifier (e.g., its filename) which is not normally changed when the record content is changed. To facilitate synchronization of the stored and printed records, a version identifier (e.g., a timestamp) is changed when the content of that record is changed. The content of a such record includes marking from which the respective record identifier and version identifier are derived. A user scans the print marking to produce marking image data. A identifier and identifier are derived from the marking image data. The record identifier accesses the current record and obtains the currently-stored version identifier. The scan-derived version identifier is compared with the currently-stored version identifier. Version identifier timestamps need not be the record timestamp but can indicate printing time.

16 Claims, 3 Drawing Sheets

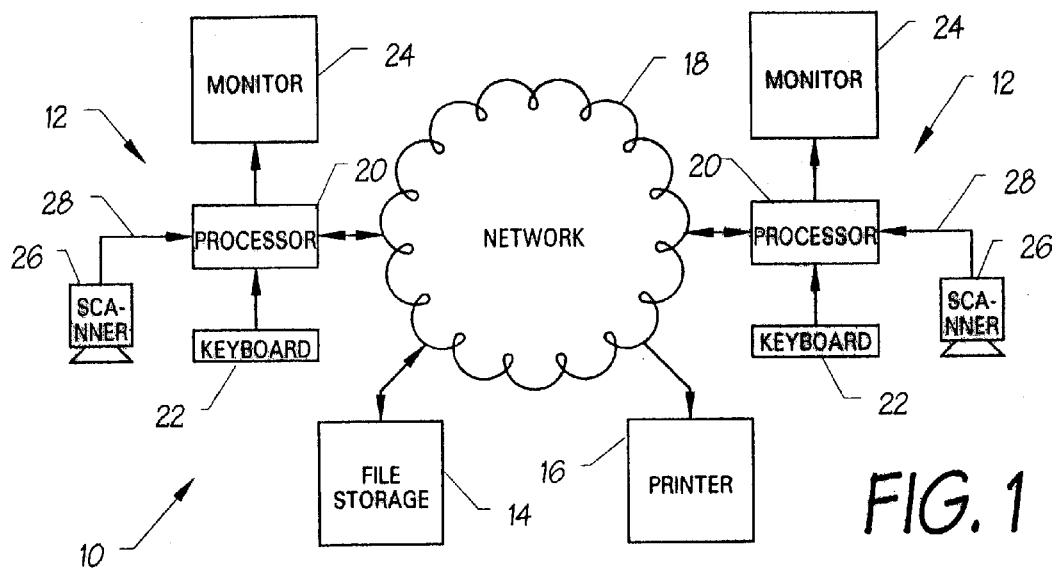
FIG. 1
FIG. 2
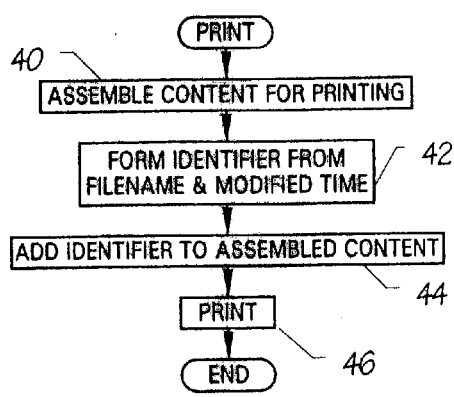
FIG. 3
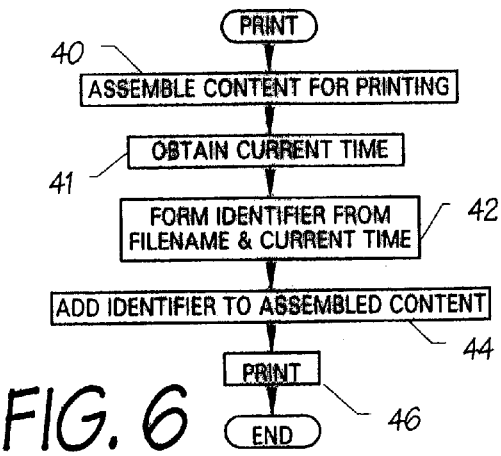
FIG. 6

ELECTRONIC RECORD STORAGE

BACKGROUND TO THE INVENTION

This invention relates to an electronic record storage system and to a method of operation thereof.

In particular, a first aspect and a second aspect of the present invention relate to a method of operation of an electronic record storage system having a plurality of stored records. Each record includes its content (such as a word processor document, spreadsheet, or drawing) which may be changed from time to time. In addition, each record has a record identifier (such as its filename or URL) which is not normally changed when the record content is changed. The content of each record can be printed out as and when required.

Such systems are, of course, extremely well known. A problem, especially for large organisations employing such a system, is that paper documents do not disappear. Indeed, in many organisations, the number of paper documents is likely to increase as a result of the introduction of electronic document systems. A problem, therefore, is how to synchronise and integrate the two kinds of documents systems, electronic and paper.

Many paper documents in an organisation are the output of electronic records produced and updated by the organisation itself. At the time of printing, the electronic and paper documents are synchronised; they both have the same content. However, over time, the electronic record and the paper document may each be modified; the electronic record may be updated, and the paper document may be annotated. There has therefore been a need for somebody manually to reconcile the electronic record with the paper document. This has been time consuming and laborious. In the meantime, people accessing an electronic record do not know whether it is up-to-date and accurate, and people looking at a paper document have a similar problem.

SUMMARY OF THE INVENTION

The method of the first aspect of the invention employs the feature that each record has a version identifier (such as a timestamp) which is changed when the content of that record is changed. In itself, this feature is already common. However, additionally, the method of the first aspect of the invention is characterised by the steps of: including, in such a print of the content of a such record, a marking from which the respective record identifier and version identifier can be derived; and, subsequently, enabling a user to scan the marking on the print (preferably with a hand-held scanner) to produce marking image data, deriving from the marking image data a scan-derived record identifier and scan-derived version identifier, using the scan-derived record identifier to access the respective current record and obtain the respective currently-stored version identifier, comparing the scan-derived version identifier with the currently-stored version identifier, and indicating to the user a result of the comparison. For example, the user can simply scan the marking on the print and be told whether or not the stored version of the record is a later version. By simple inspection of the paper, the user can see whether it has been marked up with any annotations.

Preferably, in the case where, in the comparing step, the currently-stored version identifier indicates a more up-to-date version than the scan-derived version identifier, the method further includes the steps of providing to the user an option to select printing of the currently-stored content of the stored record, and in response to such a selection, printing the currently-stored content of the respective record. The user can therefore simply obtain an up-to-date print of the stored record.

Preferably, in the case where, in the comparing step, the currently-stored version identifier indicates a more up-to-date version than the scan-derived version identifier, the method further comprises the steps of: providing to the user an option to select comparison of the currently-stored content of the record and the print; and, in response to such a selection, enabling the user to scan the print to produce content image data, deriving the content from the content image data, comparing the scan-derived content with the currently-stored content of the record, and indicating to the user the differences between the currently-stored content and scan-derived content. The user can therefore simply scan the print and be shown any differences between the printed and stored versions, for example by displaying one of the versions with the differences from the other version highlighted.

Preferably, in the case where, in the comparing step, the currently-stored version identifier and the scan-derived version identifier concur, the method further includes the steps of: providing to the user an option to select updating of the currently-stored content of the stored record; and, in response to such a selection, enabling the user to scan at least part of the print and any annotations thereon to produce update image data, updating the content of the record in dependence upon the update image data, and updating the version identifier of the record. The user can therefore simply update the stored version of the record.

In the case where the version identifier is a timestamp, the timestamp which can be derived from the marking on the print need not be the timestamp of the record, but instead may be a timestamp indicative of the time of printing. Accordingly, the method of the second aspect of the invention is characterised by the steps of: including in such a print a marking from which the respective record identifier and a timestamp indicative of the time of printing can be derived; and, subsequently, enabling a user to scan the marking on the print to produce marking image data, deriving from the marking image data a scan-derived record identifier and scan-derived timestamp, using the scan-derived record identifier to access the respective current record and obtain the respective currently-stored timestamp, comparing the scan-derived timestamp with the currently-stored timestamp, and indicating to the user a result of the comparison. Again, therefore, the user can simply scan the marking on the print and be told whether or not the stored version of the record is a later version; and by simple inspection of the paper, the user can see whether it has been marked up with any annotations.

Preferably, in the case where, in the comparing step, the currently-stored timestamp indicates a later time than the scan-derived timestamp, the method further comprises the steps of providing to the user an option to select printing of the current content of the stored record, and in response to such a selection, printing the currently-stored content of the respective record. Again, the user can therefore simply obtain an up-to-date print of the stored record.

Preferably, in the case where, in the comparing step, the currently-stored timestamp indicates a later time than the scan-derived timestamp, the method further comprises the steps of: providing to the user an option to select comparison of the currently-stored content of the record and the print; and, in response to such a selection, enabling the user to scan the print to produce content image data, deriving the content from the content image data, comparing the scan-derived content with the currently-stored content of the record, and indicating to the user the differences between the currently-stored content and scan-derived content. Again, the user can therefore simply scan the print and be shown any differences between the printed and stored versions, for example by displaying one of the versions with the differences from the other version highlighted.

Preferably, in the case where, in the comparing step, the currently-stored timestamp indicates a time no later than the scan-derived timestamp, the method further includes the steps of: providing to the user an option to select updating of the currently-stored content of the stored record; and, in response to such a selection, enabling the user to scan at least part of the print and any annotations thereon to produce update image data, updating the content of the record in dependence upon the update image data; and updating the timestamp of the record. Again, the user can therefore simply update the stored version of the record. Where a timestamp indicative of the time of printing of the document is used, a state of concurrence may be defined as the content of the record being changed no later than the time at which the document was printed, and may additionally be defined as the print of the document occurring within a predetermined period of time of the change of content. For example if a document is printed within 10 minutes of the content being changed, concurrence may be defined to exist.

A third aspect of the present invention provides an electronic record storage system which is arranged to perform the method of the first or second aspect of the invention.

A fourth aspect and a fifth aspect of the present invention also relate to complementary electronic record storage system. The system comprises: means for storing a plurality of records, each record having a record identifier, content which may be changed from time to time, and a version identifier which is changed when the content of that record is changed; means for printing the content of such a record; and means for scanning a print of a record.

The system of the fourth aspect of the invention is characterised in that the system is arranged: to include in such a print a marking from which the respective record identifier and version identifier can be derived; and, subsequently, to enable a user to scan the marking on the print to produce marking image data, to derive from the marking image data a scan-derived record identifier and scan-derived version identifier, to use the scan-derived record identifier to access the respective current record and obtain the respective currently-stored version identifier, to compare the scan-derived version identifier with the currently-stored version identifier, and to indicate to the user a result of the comparison.

The system of the fifth aspect of the invention is characterised in that the system is arranged: to include in such a print a marking from which the respective record identifier and a timestamp indicative of the time of printing can be derived; and, subsequently, to enable a user to scan the marking on the print to produce marking image data, to derive from the marking image data a scan-derived record identifier and scan-derived timestamp, to use the scan-derived record identifier to access the respective current record and obtain the respective currently-stored timestamp, to compare the scan-derived timestamp with the currently-stored timestamp, and to indicate to the user a result of the comparison.

BRIEF DESCRIPTION OF THE DRAWINGS

Specific embodiments of the present invention will now be described, purely by way of example, with reference to the accompanying drawings, in which:

FIG. 1 is a schematic block diagram of an electronic record system;

FIG. 2 is a table illustrating the data associated with records stored by the system of FIG. 1;

FIG. 3 is a flow diagram showing steps taken in the printing of a record by the system of FIG. 1;

FIG. 6 shows a modification to the flow diagram of FIG. 3.

DESCRIPTION OF PREFERRED EMBODIMENTS

Figure 4:
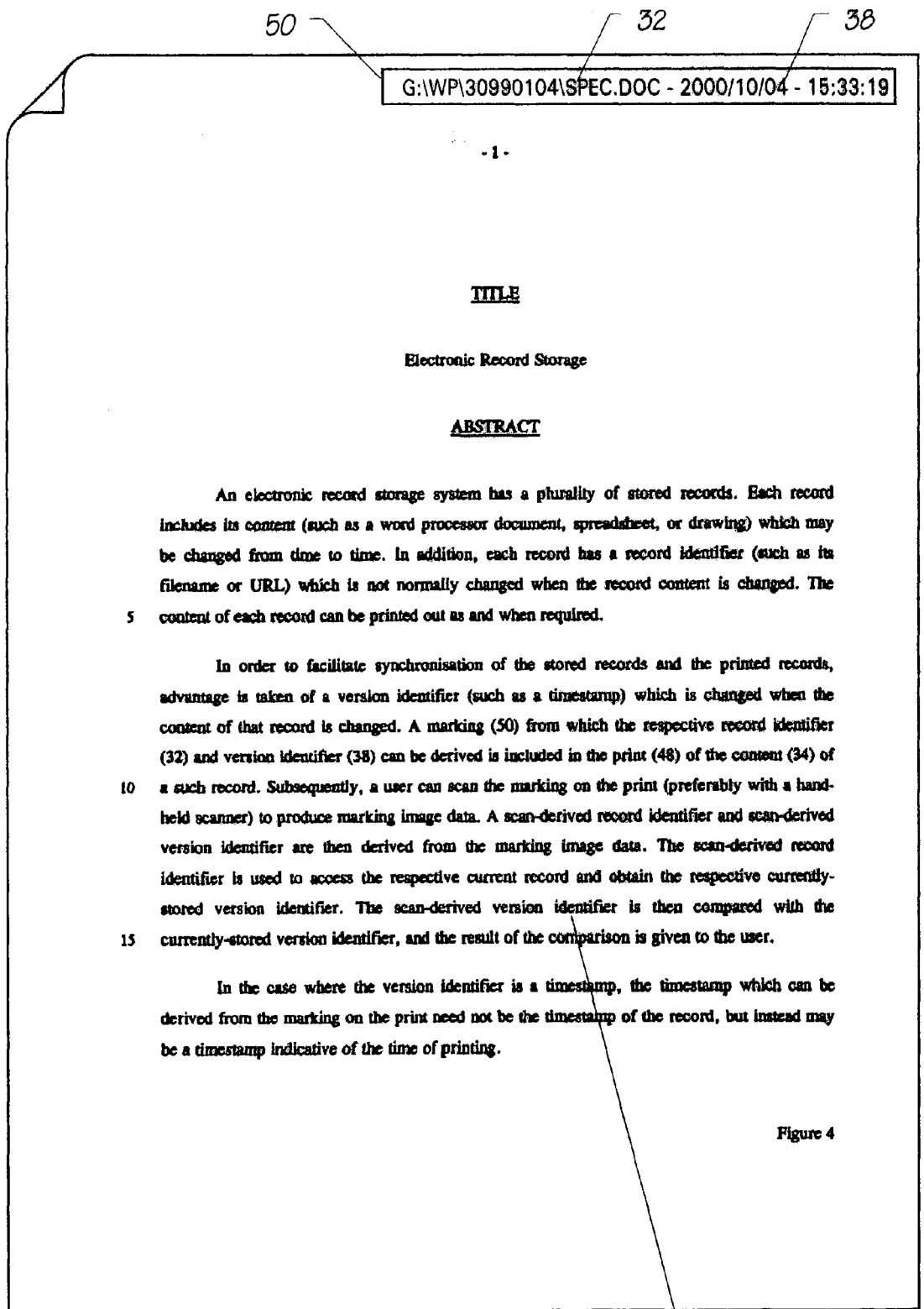
FIG. 4 is an example of a record printed by the system of FIG. 1.

Referring to FIG. 1, an electronic record system 10 is implemented as a computer system having one or more user computers 12, one or more file storage computers 14 and one or more printers 16 connected together by a network 18. Each of the user computers 12 includes a processor 20, keyboard 22, monitor 24 and other hardware usually associated with such a computer. Additionally, at least one of the user computers has a hand-held scanner 26 corrected to it, for example by means of an infra-red link 28. Although the file storage is shown in FIG. 1 as being provided by a separate computer 14, it may be provided by one or more of the user computers 12. The network 18 may be any suitable form of network, such as a local area network and/or the internet. Indeed, in a simple embodiment of the system with only one computer 12 which also provides the file storage, the network may amount to no more than a connection between the user computer 12 and the printer 16.

The or each scanner 26 may be provided by a CapShare (trade mark) e-copier, for example model 920, produced by Hewlett-Packard Company. The CapShare scanner is a battery-powered, pocket-sized, hand-held device which can moved (or "swiped") across a paper document to read information from it. This information may be pre-printed matter and/or information which has been written on the document by a user. The information may include text, line-art, graphics, barcodes, etc. The Capshare scanner 26 is powered by batteries and comprises a processor and associated volatile and non-volatile memory. An image sensor captures the information provided by the document as the device is swiped across the document, processes the captured information and stores the processed information in its memory. A number of user-operable keys are provided to enable the user to control the device and enter additional information. A liquid crystal display is provided to display messages to the user and also the captured image. The device also includes an infra-red transmitter which can be used to transmit the stored information to the co-operating computer 12. These and other features of the CapShare scanner and are described in more detail in the product and patent literature.

Referring now also to FIG. 2, the file storage computer 14 stores a plurality of files 30. Each file 30 has: a filename 32 with which that file can be accessed in the system 10; the file content 34, such as a word processor document, spreadsheet or drawing; a "creation time" 36 giving the date and time when the file 30 was initially created; and a "modified time" 38 giving the date and time when the file 30 was last modified. In itself, this is conventional.

The system is arranged so that, whenever a document is printed from one of the files, an identifier is also printed on the document. The identifier is formed from the respective filename 32 and modified time 36, and may simply be text which is printed on the document, or it may be encoded text or, more preferably, machine-readable code such as a barcode or glyph. This may be done by modifying the applications used to create and edit the files 30 so that such identifiers are automatically included in the file content 34, or, as shown in FIG. 3, by modifying the print procedure so that such identifiers are added to the content at the time of printing. Thus, in step 40, the content 34 of the file is assembled for printing; in step 42, the identifier is formed from the filename 32 and modified time 38; in step 44, the identifier is added to the assembled content; and, in step 46, the assembled content including the identifier is printed. Steps 42,44 are therefore additional to a conventional printing procedure.

An example of the product of such a printing procedure is shown in FIG. 4. As can be seen, the paper 48 is printed not only with the file content 34 but also with the identifier 50 which includes the filename 32 and the modified time 38. In the case of a multi-page document, the identifier may merely be printed one of the pages, such as the first page, or it may be printed on every page.

Figure 5:
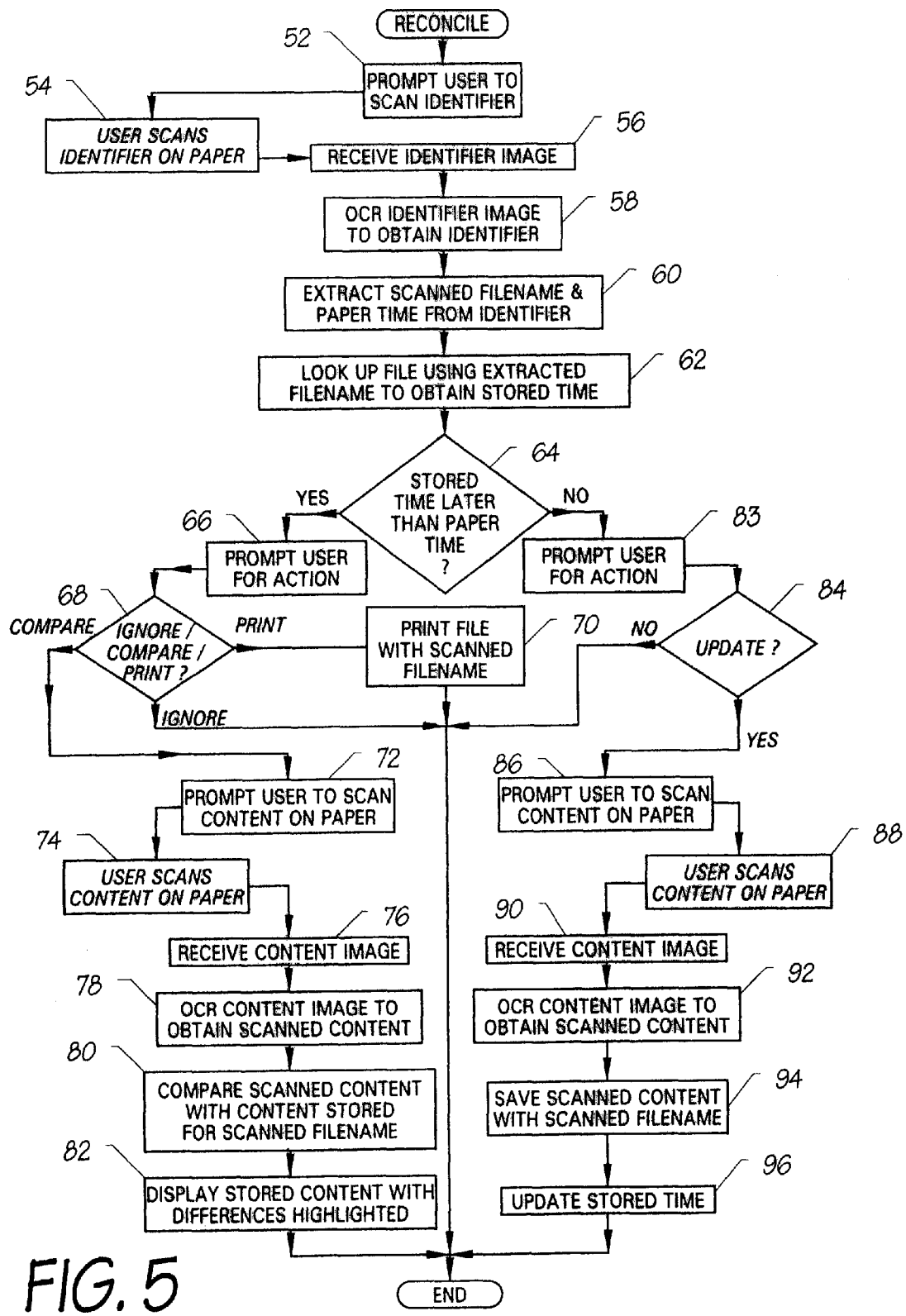
FIG. 5 is a flow diagram showing steps taken by the system of FIG. 1 and by a user during reconciliation of a stored record and a printed record.

When a user wishes to reconcile a printed record with the stored record, the user instigates a procedure as shown in FIG. 5. The steps shown in italics to the far left and far right in FIG. 5 are performed by the user, and the other steps in normal print are performed by the system 10.

First, in step 52, the user is prompted to scan the identifier 50 on the document 48 using the scanner 26. The prompt may be by way of a message on the monitor 24 or on the display of the scanner 26. Then, in step 54, the user performs the scan. In step 56, the scanner 26 receives an image of the identifier and, in step 58, performs an optical character recognition process on the image in order obtain the identifier 50. In step 60, the filename 32 and modified time $38p$ (the "p" denoting the time obtained from the paper) are extracted from the identifier 50. The file in the file storage 14 having that filename 32 is then looked up, in step 62, in order to obtain the modified time $38s$ (the "s" denoting the time obtained from the file storage 14) for the currently stored version of the file. Then in step 64, a comparison is made between the paper time $38p$ and the stored time $38s$.

If in step 64 it is determined that the stored time $38s$ is later than the paper time $38p$, then, in step 66, the user is prompted for the action which is required, for example "Compare", "Print" or "Ignore." If, in step 68, the user chooses to ignore the discrepancy in times, the procedure ends. If, in step 68, the user chooses to print the current version of the file, then, in step 70, the current version of the file with the filename 32 is printed by the printer 16, and then the procedure ends. If, in step 68, the user chooses to compare the stored and printed version of the file, then, in step 72, the user is prompted to scan the content $34p$ on the paper. Once the user has done this in step 74, then, in step 76, the scanner 26 receives and pieces together an image of the content $34p$ on the paper. Then, in step 78, the scanner 26 performs an optical character recognition process on the image in order to obtain the content $34p$ on the paper. In step 80, the currently stored content $34s$ of the file is obtained from the file storage 14 and is compared with the content $34p$ on the paper, and then, in step 82, the stored content $34s$ is displayed on the monitor 24 with the differences between the stored content $34s$ and the paper content $34p$ highlighted. The reconciliation procedure then ends. However, the user can then edit the file so as to incorporate any of the highlighted differences, as desired, clarify any OCR uncertainties, and then save the file.

If in step 64 it is determined that the stored time $38s$ is not later than the paper time $38p$ (in which case the times ought to be equal), then, in step 83, the user is prompted for the action which is required, for example to "Update" the stored file with any annotations which have been made to the printed document, or "Not Update". In the latter case, the procedure ends. However, in the former case, in step 86, the user is prompted to scan the content $34p$ on the paper. Once the user has done this in step 88, then, in step 90, the scanner 26 receives and pieces together an image of the content $34p$ on the paper. Then, in step 92, the scanner 26 performs an optical character recognition process on the image in order to obtain the content $34p$ on the paper. Then, in step 94, the content is saved in the file storage with the filename that was extracted in step 60, and in step 96 the stored time $38p$ for the file is updated with the current time. Then, the procedure ends. Optionally, between steps 92 and 94, the user may then be allowed to edit the content and/or clarify any OCR uncertainties.

It will be appreciated from the above that the procedure readily permits the user:

to check whether the paper version of the document is current;

to print the current stored version of the document;

to compare the paper version of the document and the stored version and to produce a revised document incorporating any changes made to the stored version and any annotations made to the paper version; and to replace the current stored version of the document with the paper version, including any annotations that have been made.

It will be appreciated that many modifications and developments may be made to the embodiment of the invention described above.

For example, each file may have a version number which is incremented each time the file is modified. In this case, instead of including the modified time 38 in the identifier 50 in step 42 (FIG. 3) when a file is printed, the version number may be included. It follows that it is the version number which is extracted in step 60 (FIG. 5), and the extracted and stored version numbers which are compared in step 64.

Alternatively, referring to FIG. 6, instead of including the modified time 38 in the identifier 50 in step 42 when a file is printed, the current time may be obtained from a real time clock in preceding step 41 and included in the identifier which is formed in step 42.

It should be noted that the embodiments of the invention have been described above purely by way of example and that many other modifications and developments may be made thereto within the scope of the present invention.

What is claimed is:

1. A method of operation of an electronic record storage system having a plurality of stored records, each record having a record identifier, content which may be changed from time to time, and a version identifier which is changed when the content of that record is changed, wherein the content of each record is printable from time to time, the method comprising the steps of:

printing a document which includes (a) the content of a record, and (b) a marking from which the record identifier and version identifier can be derived;

subsequently scanning the marking on the print to produce marking image data;

deriving from the marking image data a scan-derived record identifier and scan-derived version identifier;

using the scan-derived record identifier to access a current version of the record and to obtain a currently-stored version identifier of the record;

comparing the scan-derived version identifier with the currently-stored version identifier; and where the currently-stored version identifier and the scan-derived version identifier concur, providing to the user an option to select updating of currently-stored content of the record; and in response to such a selection:

enabling the user to scan at least part of the document and any annotations thereon to produce update image data;

updating the currently-stored content of the record in dependence upon the update image data; and updating the version identifier of the record.

2. A method as claimed in claim 1 wherein each version identifier comprises a number which is incremented each time the content of the record is changed.

3. A method as claimed in claim 1 wherein each version identifier comprises a timestamp indicative of the time when the content of the record was last changed.

4. An electronic record storage system comprising file storage means which stores a plurality of records, a printer, a scanner and a computer, wherein the computer is adapted to:

retrieve from file storage a record which includes a record identifier, content, and a version identifier which is changed when the content is changed;

instruct the printer to print a document which includes the content of a record and a marking from which (a) the record identifier and (b) relative age of the document and current record may be determined;

generate marking image data from a scan of the marking, derive from the marking image data a scan-derived record identifier, and use the scan-derived record identifier to access the current record;

use the scan-derived version identifier and marking image data to determine the relative age of the document and current record; and in the event that the marking image data and version identifier indicate that the document and current record concur, update content of the current record in dependence upon update image data derived from scanning at least part of the document's content and any annotations thereon.

5. A storage system according to claim 4 wherein the version identifier is a timestamp indicative of a time at which the content was last changed.

6. A storage system according to claim 4 wherein the version identifier comprises a character string which is altered each time content of the record is changed.

7. A storage system according to claim 5 wherein the marking is a time at which the document was printed.

8. A method of operating an electronic record storage system containing a plurality of records, each of which has a record identifier, content which is subject to change from time to time, and a version identifier, the method comprising the steps of:

printing a document which includes the content of a stored record and a marking from which (a) the record identifier may be identified, and (b) relative age of the document and current version of the stored record may be determined;

scanning the marking to obtain marking image data, using the marking image data to derive a scan-derived record identifier, and using the scan-derived record identifier to access the current record;

using the version identifier of the current record and the marking image data to determine the relative age of the document and the stored record;

in the event that the marking image data and stored version identifier indicate that the document and the stored record concur, providing to the user an option to select updating of currently stored content of the record, and in response to such a selection:

enabling the user to scan at least part of the document and any annotations thereon to produce update image data;

updating the currently-stored content of the record in dependence upon the update of the image data; and updating the version identifier of the record.

9. A method according to claim 8 wherein the marking includes the version identifier.

10. A method according to claim 9 wherein the version identifier comprises a timestamp indicative of a time when the content of the record was last changed.

11. A method according to claim 9 wherein the version identifier comprises a number which is incremented each time the content of the stored record is changed.

12. A method according to claim 9, wherein the marking image data and stored version identifier indicate that the document and the stored record concur if the marking image data and stored version identifier are the same.

13. A method according to claim 8 wherein the version identifier includes a timestamp indicative of a time when the content of the record was last changed.

14. A method according to claim 12 wherein the marking includes a timestamp indicative of a time at which the document was printed.

15. A method according to claim 14 wherein the marking image data and stored version identifier concur if the content of the record was changed no later than printing of the document.

16. A method according to claim 15 wherein the marking image data and stored version identifier concur if printing of the document occurred within a predetermined period of time of the time when the content of the record was last changed.

\* \* \* \* \*